United States Patent [19]

Willinger

[11] 3,857,366

[45] Dec. 31, 1974

[54] HINGED AQUARIUM COVER

[75] Inventor: Allan H. Willinger, New Rochelle, N.Y.

[73] Assignee: Metaframe Corporation, Maywood, N.J.

[22] Filed: Feb. 16, 1973

[21] Appl. No.: 333,193

[52] U.S. Cl.................................. 119/5, 240/2 LC
[51] Int. Cl......................................... A01k 64/00
[58] Field of Search.......... 119/5; 240/2 LC; 220/29

[56] References Cited
UNITED STATES PATENTS

| | | | |
|---|---|---|---|
| 2,776,642 | 1/1957 | Sepersky | 119/5 |
| 3,515,097 | 6/1970 | Sherman | 119/5 |
| 3,721,212 | 3/1973 | Groth | 119/5 |
| 3,759,224 | 9/1973 | Hall | 119/5 |

*Primary Examiner*—Hugh R. Chamblee
*Attorney, Agent, or Firm*—Friedman & Goodman

[57] ABSTRACT

An aquarium cover has a elongate planar frame member having two longitudinal edges. Elongate side panels generally of the same length as the frame member are integral with and hingedly connected to the planar frame member along opposite ones of the longitudinal edges. The planar frame member has an opening therein closed by a pane of glass. The panels are so arranged so as to be movable from extended positions wherein the panels are co-planar with the frame member and wherein the cover is adapted to cover an aquarium. The panels are also arranged to be turned about respective hinges to positions adjacent a planar surface of the frame member in substantially coextensive relation thereto whereby the cover can be conveniently stored and shipped in the folded position of the panels. Apertures, including knockouts in the form of removable tabs are provided in the panels for accommodating aquarium accessories therethrough. A light assembly includes a housing which is adapted to be mounted over the frame member. The light generated by the light assembly is transmitted through the glass pane into the aquarium when the cover is mounted thereon. When stored or shipped, the light assembly housing protects the glass pane on one side thereof while the panels, when in a folded position, protect the glass pane on the other side thereof.

13 Claims, 13 Drawing Figures

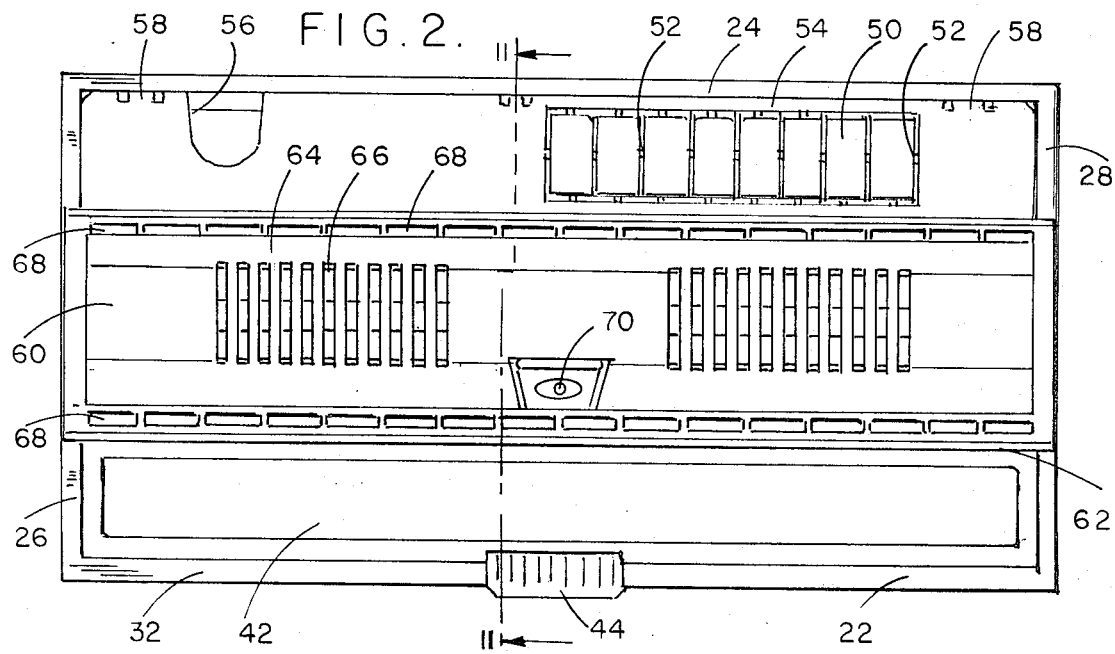
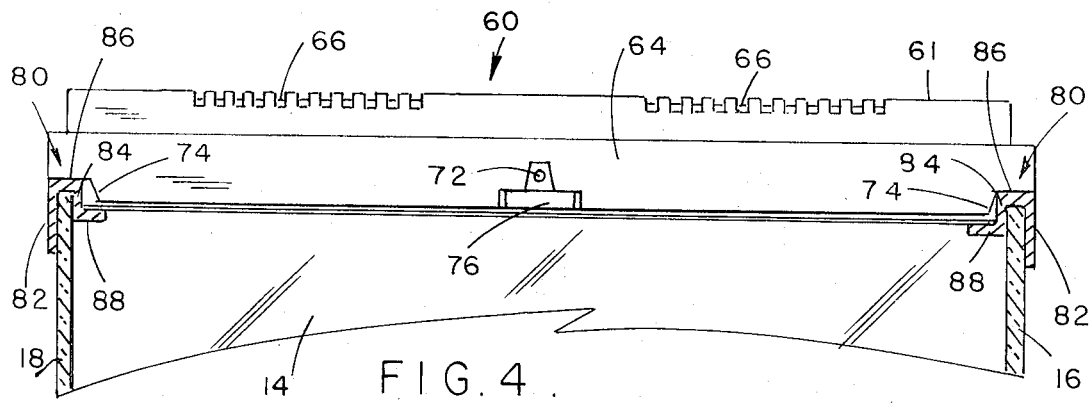

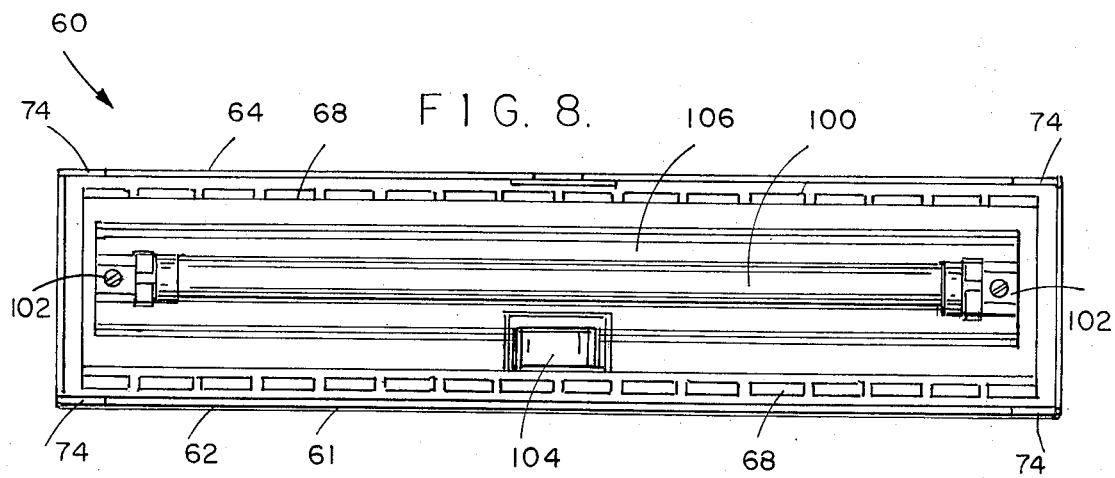
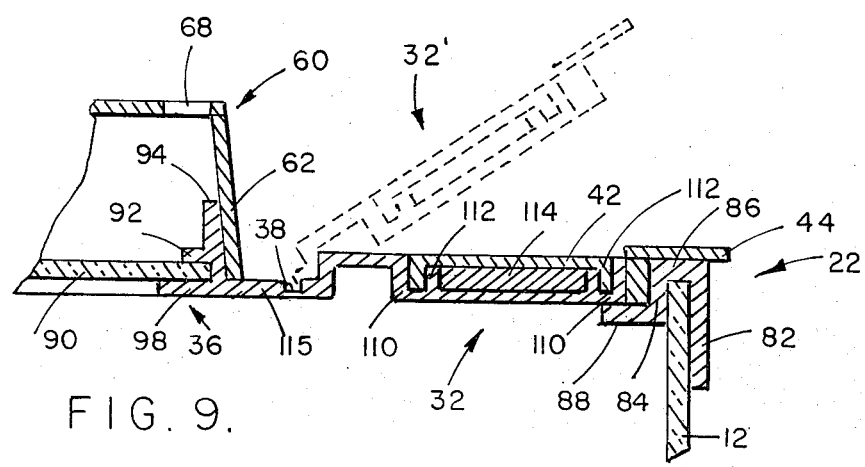
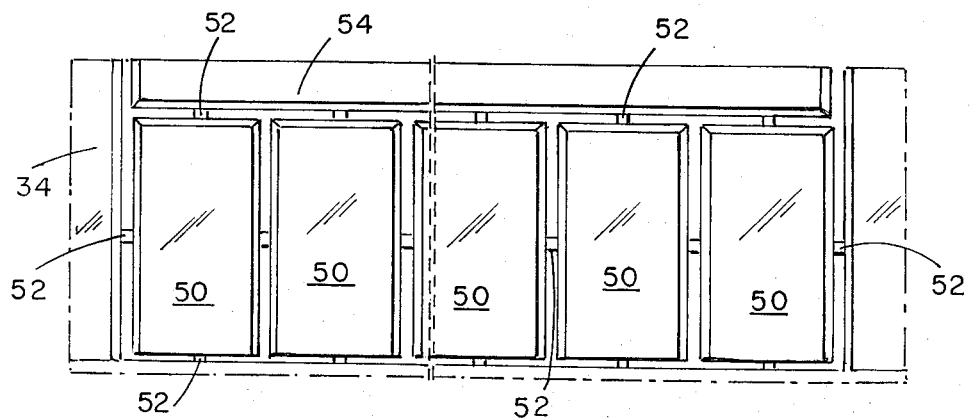

HINGED AQUARIUM COVER

BACKGROUND OF THE INVENTION

The present invention generally relates to aquarium covers, and more particularly to a hinged aquarium cover which includes a frame member and panels hingedly connected thereto which are movable from an operative position wherein the panels are essentially coplanar with the frame member to a storage or shipping position wherein the panels are arranged adjacently to a planar surface of the frame member. The present invention also relates to a light assembly which is associated with the cover and is adapted to be positioned adjacent the frame member for transmitting light therethrough in an operative position of the cover while protecting a glass pane mounted in the frame member when the cover is shipped or stored.

Numerous aquarium covers are known which are utilized in conjunction with aquarium tanks. However, most conventional designs have had disadvantages. For example, many aquarium covers are bulky and difficult to ship or store. Since most aquarium covers include a glass pane for the purpose of transmitting light therethrough into the aquarium, shipping the aquarium covers presents an especially difficult problem and special steps must be taken to protect the glass pane from breakage during shipment.

Another disadvantage of the known covers has been the difficulty in which access is achieved to the interior of the aquarium when the cover fully closes the opening thereof. Many known aquariums are made of metallic materials and are heavy. Gaining access to the interior of the aquarium has frequently required picking up the cover — this being an inconvenient and frequently difficult task. Some aquarium covers are provided with a movable member which is hinged to the main portion of the cover. However, these aquariums normally utilize mechanical or metallic hinges. The use of such hinges increases the cost of manufacture of the aquarium. Additionally, the use of metallic hinges presents problems after prolonged operation of the hinge due to the corroding effects which the aquarium water has the hinge.

Other problems which have been characteristic of the known aquariums have included the limited or fixed apertures which are provided in the cover for accommodating aquarium accessories. Due to the fact that most aquariums are made from metallic materials, the user of the aquarium is severly limited in the flexibility which is provided insofar as aquarium accessory openings are concerned. Thus, it frequently happens that more openings in the aquarium cover are deemed desirable than that amount which is actually provided, while, on the other hand, it also sometimes happens that more openings in the aquarium cover are provided than that which is desired. In either case, the prior art covers provided no simple means for adjustably increasing or decreasing the total number of apertures in the aquarium cover to suit particular needs.

A further disadvantage of the known aquarium covers include the fact that most known aquariums do not sufficiently protect the electrical hardware which supports the lightbulbs and associated light assemblies. Corrosion of the metallic contacts in the bulb sockets, for example, forms a common cause of aquarium light failures.

The hinged aquarium cover and light assembly in accordance with the present invention is easy to store and safe to ship. The light assembly is associated with the cover but may be separated therefrom and utilized separately without the cover. When used with the cover, the light assembly is associated with a central frame member which supports a glass pane, while panels are hinged to the frame member on each side thereof. The panels include both fixed and adjustable apertures to accommodate various aquarium accessories.

SUMMARY OF THE INVENTION

Accordingly, it is an object of the present invention to provide an aquarium cover which does not have the above described disadvantages of prior art covers.

It is another object of the present invention to provide an aquarium cover which is simple in construction and economical to manfacture.

It is still another object of the present invention to provide an aquarium cover which includes at least one panel hingedly connected to a planar frame member by means of a hinge integral with the panel and the member.

It is yet a further object of the present invention to provide an aquarium cover of the type under discussion which is associated with a light assembly which itself can be used separately or apart from the cover.

It is a further object of the present invention to provide an aquarium cover which includes panels adapted to cover an aquarium in extended positions thereof while protecting a glass pane mounted in a frame member of the cover in folded positions of the panels, as during shipment or storage.

It is still a further object of the present invention to provide an aquarium cover as in the last mentioned object which is further associated with a light assembly whose housing is positioned on the other side of the frame member from the side on which the panels are folded to thereby fully shield the glass pane mounted in the frame member against external forces during shipment or storage.

It is yet a further object of the present invention to provide an aquarium cover which includes apertures whose effective openings are adjustable so as to accommodate various sized aquarium accessories.

It is an additional object of the present invention to provide an aquarium cover having a frame member and panels hingedly connected thereto which is integrally made from a single plastic material.

It is yet an additional object of the present invention to provide a plastic cover in which panels are hingedly connected to a frame member by means of weakened line portions running longitudinally along the edges of frame member.

It is also an object of the present invention to provide an aquarium cover which is made from a substantially soft plastic and which includes means for preventing warping of the cover.

In order to achieve the above objects, as well as others which will become apparent hereafter, the aquarium cover in accordance with the present invention includes an elongate planar frame member having two longitudinal edges. At least one elongate side panel is provided which is generally of the same length as said frame member and hingedly connected to the latter along said one of said longitudinal edges. Said panel is arranged to be placed in an extended position wherein said panel is coplanar with said frame member. Said panel is also arranged to be placed in a folded position wherein said panel is disposed adjacent a planar surface of said frame member in substantially coextensive relation thereto. In this manner, the cover is adapted to cover an aquarium in an extended position of said panel while the cover can be conveniently stored and shipped in the folded position of the panel.

According to a presently preferred embodiment, the aquarium further comprises a second elongate side panel generally of the same length as said frame member and hingedly connected to the other of said longitudinal edges. Both said panels are arranged to be placed in extended positions and in folded positions.

According to one feature of the invention, both panels are arranged to be disposed adjacently to the same planar surface of said frame member in the folded positions of said panels. A light assembly which is associated with the cover is configured to be placed adjacently to the other planar surface of the frame member. In this manner, a glass pane supported in the frame member is protected against external forces during shipment or storage of the aquarium cover.

Advantageously, said frame member and said panels are made from the same material, such as plastic. Said frame member and said panel are hingedly connected to each other along a weakened line portion about which said panel is hinged to said frame member.

Aperture means in said panel are provided for passage of aquarium accessories therethrough which said panel is disposed in an extended position and the latter together with said frame member cover and aquarium. Removable tabs in the form of knockouts may be provided whereby the effective size of said aperture openings may be selectively adjusted by removing the desired number of the tabs. Weight means, as well as projecting fingers, may be provided for maintaining the panels in covering relation on the aquarium.

BRIEF DESCRIPTION OF THE DRAWINGS

With the above and additional objects and advantages in view, as will hereinafter appear, this invention comprises the device, combinations and arrangements of parts hereinafter described and illustrated in the accompanying drawings of a preferred embodiment in which:

FIG. 2 is a top plan view of the aquarium cover and light assembly shown in FIG. 1;

FIG. 3 is a front elevational view of the aquarium cover and light assembly shown in FIG. 1, showing the aquarium sides in cross section to illustrate how the light assembly cooperates with the ledges or rims of the aquarium;

FIG. 4 is a rear elevational view of the aquarium cover and light assembly of FIG. 1, showing the sides of the aquarium in cross section to illustrate how the light assembly cooperates with the ledges or rims of the aquarium;

FIG. 8 is a bottom plan view of the light assembly shown in FIG. 1, showing a single flourescent bulb mounted inside the light assembly housing;

FIG. 9 is an enlarged fragmented cross section of the aquarium cover and light assembly housing as shown in FIG. 11;

FIG. 10 is an enlarged top plan view of the construction of the removable tabs or knockouts provided in the rear panel of the cover shown in FIG. 1;

DETAILED DESCRIPTION OF THE PREFERRED EMBODIMENTS

Figure 1:
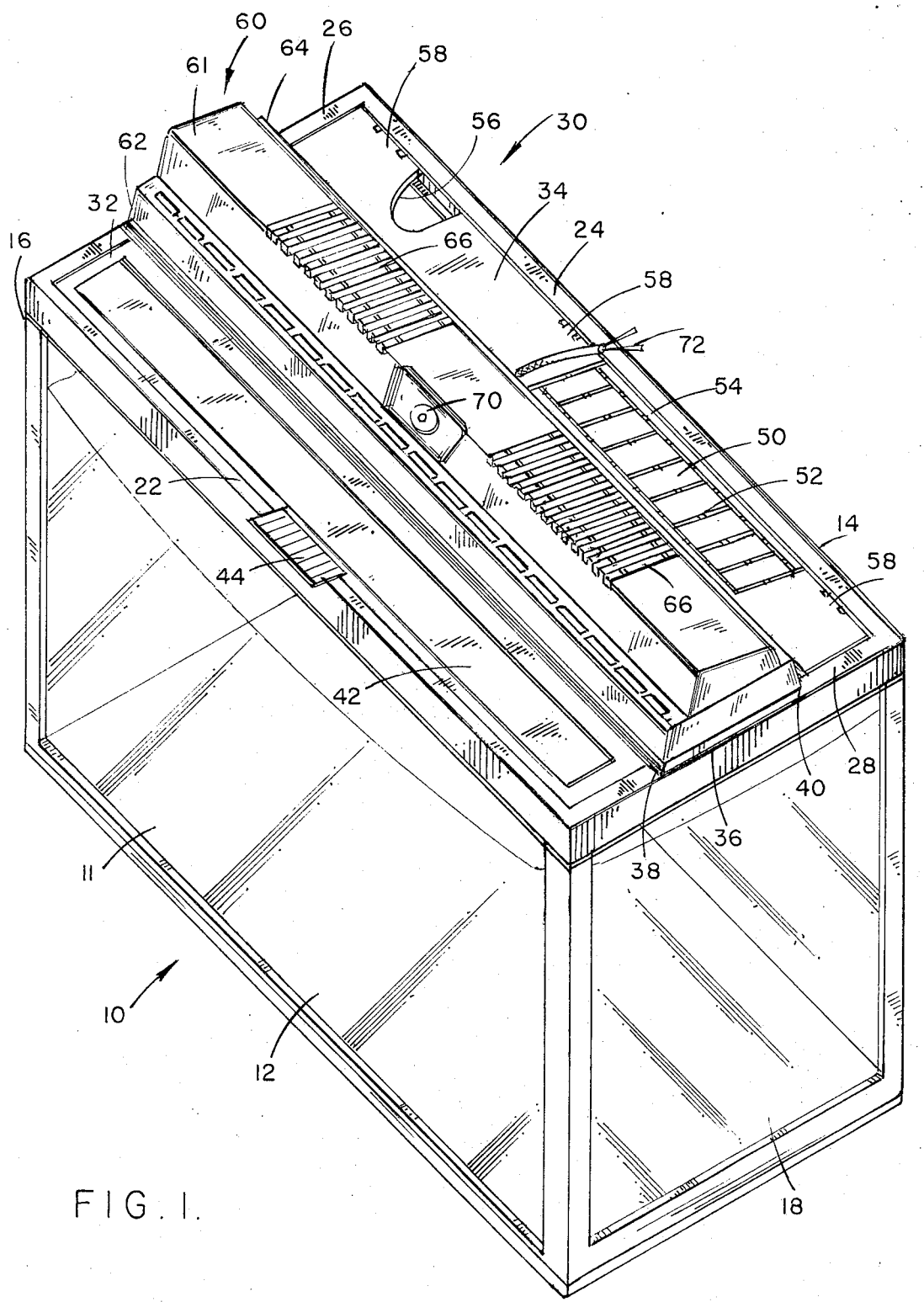
FIG. 1 is a perspective view of an aquarium cover and light assembly in accordance with the present invention, shown mounted on an aquarium.

Referring now to the drawings, wherein similar or identical parts have been designated by the same reference numerals, and first referring to FIGS. 1, and 2 an aquarium 10, filled with water 11, is shown which has a front side 12, a rear side 14, a left side 16 and a right side 18. The construction of the aquarium 10 may be conventional except as specifically described hereinafter. A front ledge or rim 22 extends along the top edge of the front side 12 while a rear ledge or rim 24 extends along the top edge of the rear side 14. Similarly, a left ledge or rim 26 is associated with the left side 16 while a right ledge or rim 28 associated with the right side 18 of the aquarium.

The aquarium cover in accordance with the present invention is designated by the reference numeral 30 and generally consists of a front section or panel 32; a rear 36.

Advantageously, although this is not a critical feature of the present invention, the panels 32 and 34 are made from the same material as is the frame member 36. Preferably, the panels 32, 34 are integrally formed with the frame member 36 and hingedly connected to the latter along a front hinge 38 and along a rear hinge 40 respectively. The front hinge 38 and rear hinge 40, which such integral construction is utilized, may comprise a weakened line portion extending longitudinally of the panels and frame member.

The front panel 32 is generally elongate and generally of the same length as the length of the frame member 36. The front panel is provided with a removable lid 42 which closes a channel or a recess adapted to receive a weighing member, as to be more fully described in connection with FIG. 9.

The dimensions of the aquarium cover 30 are so selected so that the cover fits interiorly of the ledges or rims which defined the opening to the aquarium. The aquarium cover 30 is supported by an internally projecting lip, to be described more fully hereafter, which advantageously supports the aquarium cover 30 at such a level which causes the top surfaces of the panel 32, 34, as viewed in FIG. 1, to be substantially level or coextensive with the ledges or rims of the aquarium 10. When so constructed, the front panel 32 is advantageously provided with a gripping portion 44 which extends above and beyond the front rim 22, as best shown in FIG. 9. The gripping portion 44 facilitates gripping of the front panel 32 when the latter is positioned below the upper edge portions of the front rim 32.

Now also referring to FIG. 10, the rear panel 34 is provided with a plurality of removable tabs in the form of knockouts 50 disposed between a connecting strip 54 and the major extent of the rear panel 34. The removable tabs 50 or knockouts are connected to each other, the connecting strip 54 as well as the rear panel 34 by means of connecting ribs 52. The connecting ribs 52 are made from material which is easily severable. Advantageously, the ribs 52 are made from a material which can easily be cut with a scissors or a razor. In this manner, an aperture formed in the rear panel 34 may be selectively enlarged to any desired size to accommodate small and large aquarium accessories.

Provided on the rear panel 34 is a cutout or opening 56 which may be performed and configured to permit passage therethrough as a standard aquarium accessory such as a heater or air filter tube. In this manner, if only one aquarium accessory is utilized, the tabs 50 may be left intact and the aquarium cover 30 substantially closes the opening of the aquarium. When further openings are desired, it is merely necessary to punch out or cut out any desirable number of removable tabs 50. In this manner, sufficient apertures in the cover may be formed without undesirably exposing the interior of the aquarium through needlessly preformed apertures.

A plurality of projecting fingers 58 are shown disposed along the length of the rear panel 34 in the vicinity of the rear rim 24. The purpose of the projecting fingers 58 is to engage a projecting lip on the rim as to be more fully described in connection with FIG. 9. The actual number of projecting fingers is not critical — two or three such fingers being suitable in most instances.

Figure 11:
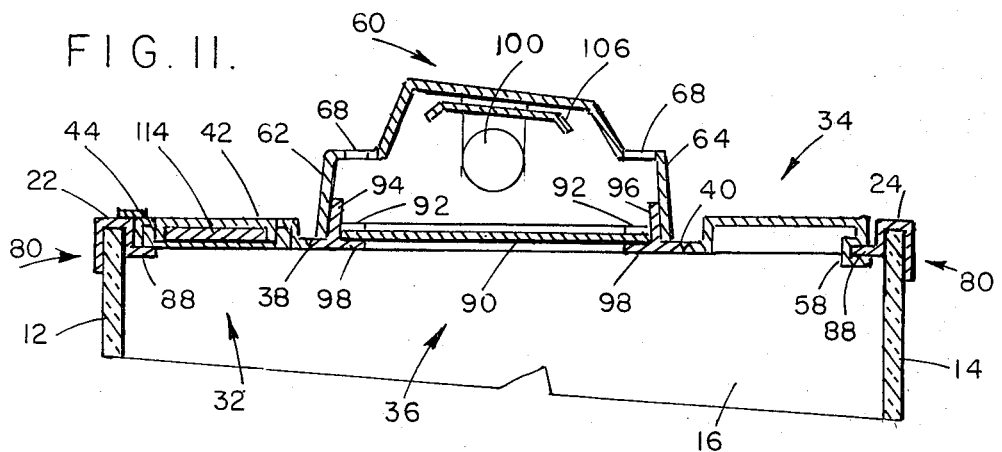
FIG. 11 is a cross sectional view of the aquarium cover and light assembly shown in FIG. 2, taken along line 11—11.

As will become evident hereafter, the aquarium cover 30 is suitable for use by itself for the purpose of covering an aquarium. However, the present invention contemplates a light assembly 60 which is associated with and cooperates with the aquarium cover 30 both in its operative mode as well as in its storage or shipping mode. The light assembly 60 includes an elongate housing 61 having a front skirt 62 and a rear skirt 64. Means, to be more fully described in connection with FIG. 9 and 11, are provided on the aquarium cover 30 for engaging the skirts 62, 64 to thereby prevent excessive transverse movement of the housing 61 while positioned on the cover 30.

The housing 61 is provided with a series of slots 66 at the top of the housing and a plurality of slots 68 adjacent to each of the skirts 62, 64 respectively. The slots 66, 68 are ventilating slots and permit hot air interiorly of the housing to escape and thereby maintain a bulb inside the housing at workably cool temperatures.

Figure 13:
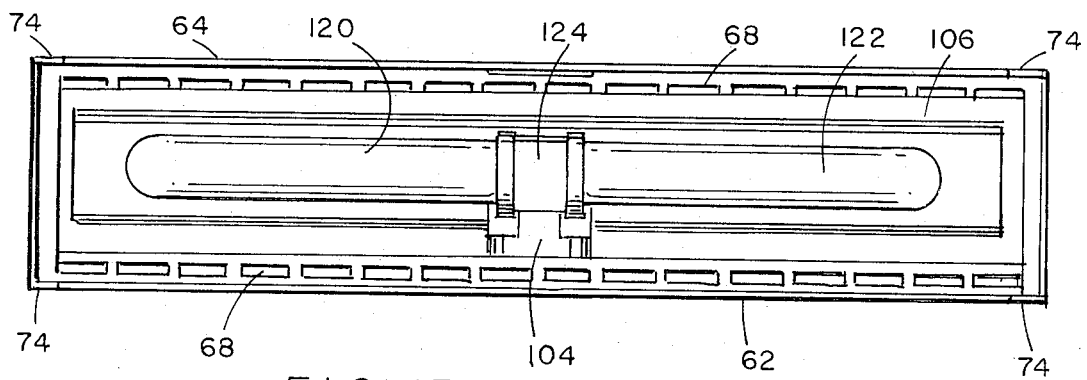
FIG. 13 is a bottom plan view of a light assembly similar to that shown in FIG. 8, but wherein two lamps are utilized in place of a single fluorescent bulb.

Provided frontally of the housing 61 is a switch 70 which controls energy flow to a bulb interiorly of the housing 61 when the switch is connected to a source of energy by means of electrical conductors 72. The manner in which the bulbs are mounted interiorly of the housing 61 is more fully described in connection with FIGS. 8 and 13.

Referring to FIGS. 3 and 4, the light assembly housing 61 is provided with cutouts 74 at each end of each shirt 62, 64 — each cutout 74 being adapted to receive a rim or ledge of the aquarium when mounted on the latter. The cutouts 74 of the left ends of the skirts, as viewed in FIG. 3, engage the left ledge or rim 26 while the cutouts 74 on the right ends of the skirts engage the right ledge or rim 28. The cutouts 74, one at each end of each skirt, together from a skirt portion therebetween which fits interiorily between the side ledges or rims 26, 28. When the rims are received in the cutouts 74, the light assembly housing 61 is prevented from excessive longitudinal movement.

Although the aquarium cover 30 has been shown in FIG. 1 to be positioned interiorly of the rims of the aquarium, the cover in accordance with the present invention may also abut or rest on top of the rims. Most functional advantages which the cover in accordance with the present invention has could similarly be achieved with such a modified overlying cover. However, the present invention is described in connection with an aquarium cover 30 which cooperates with an aquarium 10 provided with rims or ledges in the form of U-shaped channels 80. Advantageously, the channels 80 extend about the periphery of the opening of the aquarium 10. However, it is possible to achieve many of the objects of the present invention when U-shaped channels, to be described, are provided only about selected peripheral portions of the aquarium.

Each U-shaped channel 80 comprises an external portion 82, and internal portion 84 and a top support portion 86. An important feature of the aquarium which cooperates with the subject cover 30 is the provision of of an inwardly extending projecting lip 88. The projecting lip 88 is spaced or offset from the top support portion a distance substantially equal to the thickness of the front and rear panels 32, 34. The panels 32, 34 are dimensioned to fit between two oppositely spaced internal portions 84 to thereby permit the panels to grasp or be supported by the projecting lips 88. By properly selecting the thickness of the panels 32, 34 or the offset between the projecting lip 88 and the top support portion 86, the panels may be situated so that their top surfaces, as viewed in FIGS. 1 and 2, are level or coextensive with the top support portions 86. At such time, the gripping portion 44 of the front panel 32 abuts above and extends beyond the front ledge or rim 22, as best seen in FIG. 9.

A strain relief member 76 is provided on the rear skirt 64 which cooperates with the electrical conductors 72 to grip a portion of the latter in any conventional manner. The function of the strain relief member 76 is to prevent undue stresses on the internal ends of the electrical conductors 72 connected to the electrical components interiorly of the housing 61 when the electrical conductors 72 are pulled exteriorly of the housing.

Figure 5:
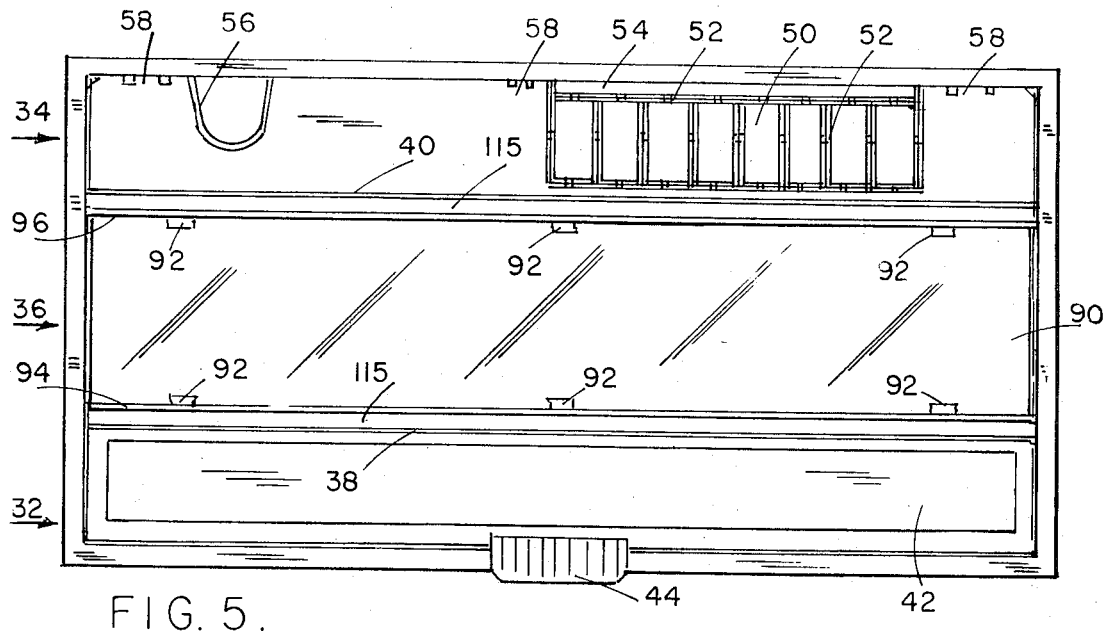
FIG. 5 is a top plan view of the aquarium cover, with the light assembly removed.
Figure 6:
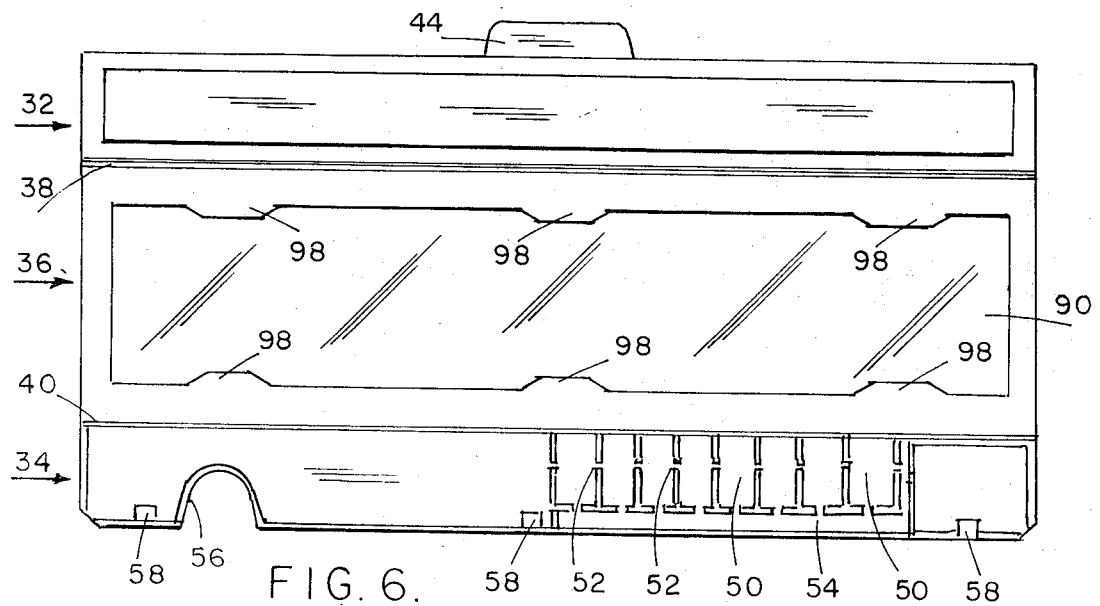
FIG. 6 is a bottom plan view of the aquarium cover shown in FIG. 5.

Referring to FIGS. 5 and 6, the aquarium cover 30 is shown in top and bottom views respectively. In FIG. 3 a middle panel or frame member 36 is shown disposed between the front and rear panels 32, 34. The frame member 36 is covered by the light assembly housing 61 in FIG. 1. The frame member 36 generally defines an elongate rectangular opening which is closed by a glass pane 90. The glass pane 90 is supported in the frame member 36 by lower retaining tabs 98 and upper retaining tabs 92 which together retain the glass in fixed position in the frame member 36, as best seen in FIG. 9.

Although a glass pane 90 is utilized to close the frame member opening, it should be clear that any other suitable material may be utilized. For example, various plastic materials may be utilized. It is also possible to utilize translucent instead of fully transparent materials.

As described in connection with FIG. 1, the aquarium cover 30 is provided with a front hinge 38 and a rear hinge 40. These hinges are shown in both FIGS. 5 and 6. Spaced from the front hinge 38 to the other side of the front panel 32 is a front retaining projection 94. A similar rear retaining projection 96 is spaced on the other side of the rear hinge 40 from the rear panel 34. The retaining projections 94, 96 will be more fully described in connection with FIGS. 9, 11 and 12.

Figure 7:
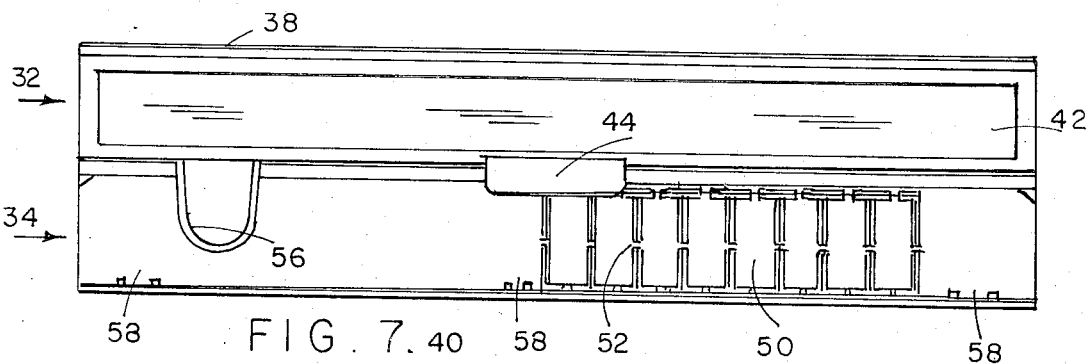
FIG. 7 is a bottom plan view of the aquarium cover shown in FIG. 6 when the panels hingedly connected along longitudinal edges of the central frame member are turned along the hinges to folded positions.

An important feature of the present invention is the manner in which the panels 32 and 34 are hinged to the frame member 36 and the manner in which the panels move from extended positions as shown in FIG. 5 to folded positions as shown in FIG. 7. More particularly, both panels 32 and 34 are movable from extended positions wherein the panels are substantially coplanar with the plane defined by the frame member 36 and wherein the panels and the frame member are adapted to cover the aquarium 10. On the other hand, when the panels are folded adjacently to one planar surface of the frame member 36, the panels overlap in coextensive relation thereto and substantially close the opening defined by the frame member. In this manner, the panels 32 and 34 protect the glass pane 90 from external forces, such as during shipment or storage. Additionally, the folding feature of the panels as described substantially decreases the overall size and bulkiness of the cover to thereby make the latter especially adapted for shipping purposes.

When the panels 32 and 34 are selected to be approximately equal in width and each slightly smaller than approximately one-half the width of the frame member 36, the panels 32 and 34 may both be folded into a common plane which is substantially parallel to the plane defined by the frame member 36. With such a construction, the gripping portion of 44 abuts against the rear panel 34 when the panels are folded and helps to maintain the rear panel in the folded position.

Referring to FIG. 9, some of the construction details of the cover and of the light assembly 60 are shown. As described above, the glass pane 90 is secured from movement in vertical direction by upper and lower retaining tabs 92, 98 respectively.

The light assembly retaining projection 94 described in connection with FIG. 5 is shown to upwardly project from the cover from the region of the upper retaining tab 92. The retaining project 94 may be slightly inclined to conform to the inclination of the light assembly skirts which are intended to engage therewith. The retaining projections 94 are so spaced and configurated so as to engage the front and rear skirts 62, 64 interiorly of the housing 61 with little clearance.

The frame member 36 is advantageously integrally made with the panels. In FIG. 9, the frame member 36 is shown integrally constructed with the front panel 32. The front panel 32 is hingedly connected to the frame member 36 by a front hinge 38 — shown to consist of a weakened line portion. Advantageously, the aquarium cover 30 is made from a pliable material such as a relatively soft plastic material To prevent warping of the front panel 32 as well as maintaining the same in an open or extended position as shown in FIG. 1, the front panel is provided with two U-shaped channels 110 spaced from each other in a direction substantially transverse to the direction of the channels. The removable lid 42, mentioned in connection with FIG. 1, is provided with strip portions or downwardly projecting portions 112 which are configurated to be received in the U-shaped channels 110. Advantageously, the strip portions 112 are received in the U-shaped channels 110 with little clearance and preferably with a pressfit so that the removable lid 42 is retained in the front panel 32 when the strip portions 112 are in engagement with the U-shaped channel 110.

The removable lid 42, together with the front panel 32, define a space therebetween which is adapted to receive and elongated weight in the form of a rod or bar 114. The function of the weight 114 is twofold. Firstly, the weight helps to maintain the front panel 32 interiorly of the aquarium 10 without inadvertently opening. Secondly, the rigidity of the weight 114 also prevents the front panel 32 from warping along its longitudinal length in time due to the temperature and humidity conditions existing inside the aquarium.

The exposed surface of the removable lid 42 defines an upper surface of the aquarium cover 30 which is substantially coextensive with the support portions 86 of the rims of the aquarium. As can best be seen in FIG. 9, a depressed portion 115 is provided between the retaining projection 94 and the hinge 38 which receives the lower edge of the front skirt 62. By permitting the skirt 62, as well as the skirt 64, to be lowered below the top support portions 86 of the rims of the aquarium the skirts may engage the rims at the respective cutouts 74, as described in connection with FIGS. 3 and 4.

To open the front panel 32, such as for placing food into the aquarium, the gripping portion 44 is secured and raised upwardly. At such time, the entire front panel 32 pivots about the front hinge 38, as represented by the reference numeral 32'.

The front hinge 38 is so configurated so as to permit pivoting motion of the front panel 32 to each side of a plane defined by the frame member 36. In this manner, the panel 32 may be raised for gaining access to the interior of the aquarium while the panel may be pivoted in the other direction to a folded position as described above. However, the rear panel 34 is not normally intended to be raised once the cover is placed on the aquarium. Once the suitable tabs 50 have been removed and the desired aquarium accessories pass through the apertures in the panel 34, the latter may be fixed in position by engaging the projecting fingers 58 with the projecting lips 88 of the rear rim or ledge. During normal use, therefore, both panels are substantially co-planar with the frame member 36 — the rear panel 34 being maintained in that position by the projecting fingers 58 while the front panel 32 is maintained in that position by utilization of the weight 114. While the front panel 32 is ooccasionally pivoted, the primary purpose for the rear hinge 40 is to permit the rear panel 34 to be moved to its folded position for purposes of shipment or storage.

The light assembly 60, except for the skirt 62, 64 construction as well as the cutouts 74 at each end thereof, may be conventional in other respects. In FIG. 8, the interior space of the housing 61 formed by the front skirt 62 and the rear skirt 64 contains a single fluorescent bulb 100 mounted in two spaced sockets 102 in a conventional manner. A switch 104 and a ballast (not shown) cooperates with the fluorescent bulb 100 in a manner well known to those skilled in the art. A reflector 106 is disposed between the bulb 100 and the housing 61 for directing the light emitted by the bulb in a direction away from the top of the housing 61.

Another possible approach, instead of a single fluorescent bulb as shown in FIG. 8, is the utilization of two elongated filament bulbs 120 and 122 mounted in a double socket 124. In all other respects, the electrical connections are similar except for the fact that a ballast is normally not required with ordinary filament bulbs.

Figure 12:
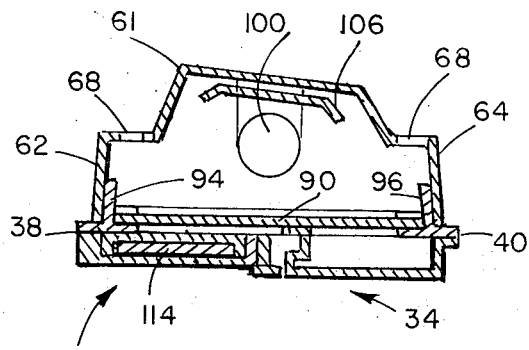
FIG. 12 is a cross section of the aquarium cover and light assembly similar to that shown in FIG. 11, but wherein the panels are in folded positions as shown in FIG. 7.

The manner in which the aquarium cover 30 in accordance with the present invention cooperates with the light assembly 60 as well as with the aquarium on which it is mounted will now be described with reference to FIGS. 11 and 12. In FIG. 12, the housing 61 of the light assembly is engaged with the retaining projections 94, 96 as described in connection with FIG. 9 and the panels are disposed in folded positions as described in connection with FIG. 7. It should become apparent that the two panels 32, 34, in their folded positions, protect the glass 90 from external forces to one side thereof. On the other hand, the housing 61 of the light assembly substantially encloses the glass 90 and protects the latter from external forces to the other side thereof. Consequently, the folded panels and the light assembly housing together form protective means or shileds which prevent breakage of the glass 90 mounted in the frame member 36, as during shipment or storage. By moving the panels to their folded positions shown in FIG. 12, the overall dimensions of the combination aquarium cover 30 and light assembly 60 are substantially reduced whereby the combination is less bulky and more convenient for both shipping and storage purposes.

In order to mount the light assembly and aquarium cover on an aquarium for normal use, each of the panels 32, 34 are pivoted about their respective hinges 38, 40 to extended or open positions wherein each of the panels are substantially co-planar with the frame member 36. Once the aquarium cover has its panels so extended, the cover may be supported about the peripheral rims or ledges of an aquarium — the light assembly 60 being disposed over the glass pane 90 to thereby cause most of the light generated by the light assembly to be transmitted downwardly through the glass pane into the aquarium.

Where the aquarium is of the type provided with U-shaped channels 80, as described in connection with FIGS. 3, 4 and 9, the planar relationship of the panels and the frame member may simply be obtained by resting the respective panels and frame member on the projecting lips 88 which extend about the periphery or opening of the aquarium. In order to prevent the rear panel 34 from inadvertently moving upwardly about the hinge 40, the projecting fingers 58 may be caused to engage the projecting lip 88 after the suitable openings or apertures have been formed in the rear panel 34. As mentioned above, the front panel 32 is maintained in the downward position by providing a weight 114 interiorly of the panel.

As should be clear from the above description, the aquarium cover 30 has its own utility apart from the light assembly 60. Similarly, the light assembly 60 has utility apart from the aquarium cover 30. Consequently, each one may be utilized without the use of the other. When the aquarium cover 30 is utilized without a light assembly 60, ambient light which is present above the aquarium cover 30 can filter in through the glass pane 90 to thereby illuminate the interior of the aquarium. When only the light assembly 60 is utilized, the latter is supported by the skirts when the left end right rims are received in respective cutouts 74.

Particular advantages are, however, obtained when both the light assembly 60 is utilized in conjunction with the aquarium cover 30. Primarily, the utilization of the aquarium cover 30 interposes the glass pane 90 between the interior of the aquarium and the electrical hardware contained interiorly of the housing 61. Consequently, the sockets, switches, etc, interiorily of the housing 61 are protected from moisture existing interiorly of the aquarium. Also, the placing of the light assembly 60 on the cover 30 causes the light assembly to press down on the cover and prevent the latter from inadvertently being lifted when, for example, the front panel 32 is pivoted by pulling the gripping portion 44 upwardly.

While the light assembly 60 and the folded panels 32, 34, shown in FIG. 12, protect the glass pane 90, it should be clear that the glass pane itself serves as a stiffening member which, due to its own rigidity, prevents the panels from warping.

Although the present invention has been described in terms of an aquarium cover having a central frame member 18 and two laterally disposed panels 32, 34, it should be clear that the invention is not limited to this construction. It is equally possible to utilize fewer or more panels, as desired. For example, a single front panel may be provided connected to a frame member which extends towards the rear rim 24 of the aquarium. With the latter construction, apertures or openings may be provided, similar to aperture 56, in the front panel for accommodating aquarium accessories. The front panel would still be hinged as described above to the frame member and movable to a folded position wherein it advantageously covered or is coextensive with the entire glass pane or frame member.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An aquarium cover comprising an elongated plastic planar frame member having two longitudinal weakened line portions and an opening therein; light transmitting means extending across and covering said opening; a first elongate side panel generally of the same length as said frame member and hingedly connected to the latter along one of said longitudinal weakened line portions; a second elongate side panel generally of the same length as said frame member and hingedly connected to the other of said longitudinal weakened line portions, said panels being arranged to be placed in extended positions wherein said panels are co-planar with said frame member; said panels also being arranged to be placed in folded positions wherein said panels are disposed adjacent the planar surface of said frame member in substantially coextensive relation thereto, whereby the cover is adapted to cover an aquarium in the extended positions of said panels while the cover can be conveniently stored and shipped in the folded positions of said panels.

2. An aquarium cover as defined in claim 1, wherein both said panels are arranged to be disposed adjacently to the same planar surface of said frame member in the folded positions of said panels.

3. An aquarium cover as defined in claim 2, further comprising light generating means having a housing configured to engage the other planar surface of said frame member, said housing and said panels in their folded positions together substantially surrounding said light transmitting means, whereby said light transmitting means is protected from external forces.

4. An aquarium cover as defined in claim 1, wherein said panel is hinged to said frame member by means of a hinge integral with said panel and with said frame member.

5. An aquarium cover comprising an elongate plastic planar frame member having two longitudinal weakened line portions and an opening therein; light transmitting means extending across and covering said opening; at least one elongate side panel generally of the same length as said frame member and hingedly connected to the latter along one of said longitudinal weakened line portions, said frame member and said panel being integrally formed and connected to each other along a weakened line portion about which said panel is hinged to said frame member, said panel being arranged to be placed in an extended position wherein said panel is co-planar with said frame member, said panel also being arranged to be placed in a folded position wherein said panel is disposed adjacent the planar surface of said frame member in substantially coextensive relation thereto, whereby the cover is adapted to cover an aquarium in the extended position of said panel while the cover can be conveniently stored and shipped in the folded position of said panel.

6. An aquarium cover as defined in claim 5, in combination with an aquarium having inwardly projecting lips adjacent the rim of the aquarium, wherein said frame member and said panel are dimensioned to be receivable interiorly of the aquarium in abutting relation to said inwardly projecting lips when said panel is in said extended position.

7. An aquarium cover as defined in claim 6, wherein said frame member and said panel each have a top surface when covering the aquarium, said top surfaces being substantially coextensive with said rim of the aquarium.

8. An aquarium cover as defined in claim 6, further comprising weight means associated with said panel for maintaining the latter in abutting relation to said inwardly projecting lips in an extended position when covering the aquarium.

9. An aquarium cover as defined in claim 8, wherein said panel includes an elongate channel; said weight means comprising a metallic bar receivable in said channel; and a removable lid adapted to enclose said metallic bar in said channel.

10. An aquarium cover comprising an elongate plastic planar frame member having two longitudinal weakened line portions and an opening therein; light transmitting means extending across and covering said opening; at least one elongate side panel generally of the same length as said frame member and hingedly connected to the latter along one of said longitudinal weakened line portions, said panel being arranged to be placed in an extended position wherein said panel is co-planar with said frame member, said panel also being arranged to be placed in a folded position wherein said panel is disposed adjacent the planar surface of said frame member in substantially coextensive relation thereto, whereby the cover is adapted to cover an aquarium in the extended position of said panel while the cover can be conveniently stored and shipped in the folded position of said panel; aperture means in said panel for passage of aquarium accessories therethrough when said panel is disposed in an extended position and said panel together with said frame member cover an aquarium; a plurality of series-connected removable tabs together covering said aperture means; and rib means for connecting said tabs to said panel and to each other, said rib means being made from a severable material, whereby the effective size of said aperture means opening may be selectively adjusted by removing a desired number of said removable tabs by severing respective ones of said rib means.

11. An aquarium cover in combination with an aquarium having inwardly projecting lips adjacent the rim of the aquarium, the cover comprising an elongate plastic planar frame member having two longitudinal weakened line portions and an opening therein; light transmitting means extending across and covering said opening; at least one elongate side panel generally of the same length as said frame member and hingedly connected to the latter along one of said longitudinal weakened line portions, said frame member and said panel being dimensioned to be receivable interiorly of the aquarium in abutting relation to said inwardly projecting lips when said panel is in extended position, said panel having an edge extending adjacently to said rim when covering the aquarium, and further comprising at least one projecting finger configured to engage said projecting lip to thereby prevent relative movement of said panel relative to said projecting lip when said panel covers the aquarium, said panel being arranged to be placed in an extended position wherein said panel is co-planar with said frame member, said panel also being arranged to be placed in a folded position wherein said panel is disposed adjacent the planar surface of said frame member in substantially coextensive relation thereto, whereby the cover is adapted to cover an aquarium in the extended position of said panel while the cover can be conveniently stored and shipped in the folded position of said panel.

12. An aquarium cover comprising an elongate plastic planar frame member having two longitudinal weakened line portions and an opening therein; light transmitting means extending across and covering said opening; at least one elongate side panel generally of the same length as said frame member and hingedly connected to the latter along one of said longitudinal weakened line portions, said panel being arranged to be placed in an extended position wherein said panel is co-planar with said frame member, said panel also being arranged to be placed in a folded position wherein said panel is disposed adjacent the planar surface of said frame member in substantially coextensive relation thereto, whereby the cover is adapted to cover an aquarium in the extended position of said panel while the cover can be conveniently stored and shipped in the folded position of said panel; light generating means associated with said frame member for generating light directed through said opening into an aquarium when the frame member and said panel cover the aquarium, said light generating means comprising a housing having two spaced skirts; and further comprising two spaced retaining projections extending from said frame member, said two spaced retaining projections being adapted to engage said skirts and prevent said housing from moving in a direction normal to that of said longitudinal edges.

13. An aquarium cover as defined in claim 12, wherein said skirts are provided at each end with cut-outs adapted to engage the rim of an aquarium to thereby prevent said housing from moving in a direction parallel to that of said longitudinal weakened line portions.

* * * * *